(12) United States Patent
Lu (10) Patent No.: US 10,225,231 B2
(45) Date of Patent: Mar. 5, 2019

(54) METHOD AND SERVER OF REMOTE INFORMATION QUERY

(71) Applicant: Alibaba Group Holding Limited, Grand Cayman (KY)

(72) Inventor: Kun Lu, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 96 days.

(21) Appl. No.: 14/801,224

(22) Filed: Jul. 16, 2015

(65) Prior Publication Data
US 2016/0021114 A1    Jan. 21, 2016

(30) Foreign Application Priority Data
Jul. 17, 2014 (CN) .......................... 2014 1 0342598

(51) Int. Cl.
*G06F 21/00* (2013.01)
*H04L 29/12* (2006.01)

(52) U.S. Cl.
CPC ...... *H04L 61/1511* (2013.01); *H04L 61/1552* (2013.01); *H04L 61/304* (2013.01); *H04L 61/305* (2013.01)

(58) Field of Classification Search
CPC ............. H04L 61/1511; H04L 61/1552; H04L 61/305; H04L 61/304
See application file for complete search history.

(56) References Cited

U.S. PATENT DOCUMENTS 6,976,090 B2 * 12/2005 Ben-Shaul .......... G06F 17/3089
707/E17.116
7,228,359 B1    6/2007 Monteiro
(Continued)

FOREIGN PATENT DOCUMENTS

| CN | 101626375 A | 1/2010 |
|---|---|---|
| CN | 101662477 A | 3/2010 |
| CN | 101902442 A | 12/2010 |
| CN | 102035809 A | 4/2011 |

OTHER PUBLICATIONS

PCT Search Report and Written Opinion dated Oct. 15, 2015 for PCT Application No. PCT/US15/40726, 8 pages.
(Continued)

*Primary Examiner* — Kendall Dolly
(74) *Attorney, Agent, or Firm* — Lee & Hayes, P.C.

(57) ABSTRACT

A method and a server of remote information query are disclosed. The method includes receiving a query request sent by a client side and acquiring content of a type field of the query request; acquiring a type of the query request based on the content of the type field; adding a type identifier corresponding to the type and a domain name of a preset authorized DNS (Domain Name System) to the query request to acquire a target query request; and sending the target query request to a local DNS to enable the local DNS to send the target query request to the preset authorized DNS according to the domain name of the preset authorized DNS in the target query request, and receiving a response message corresponding to the type of the query request from the preset authorized DNS. Thus, a simpler and highly efficient recognition of user security can be realized.

18 Claims, 5 Drawing Sheets

(56) References Cited

U.S. PATENT DOCUMENTS

| | | | |
|---|---|---|---|
| 7,877,493 B2* | 1/2011 | Quinlan | G06Q 10/107 |
| | | | 709/206 |
| 8,650,245 B1 | 2/2014 | Ashley | |
| 2002/0016831 A1 | 2/2002 | Peled et al. | |
| 2008/0092228 A1 | 4/2008 | Baum | |
| 2009/0144408 A1 | 6/2009 | Wilf et al. | |
| 2010/0023611 A1 | 1/2010 | Yang et al. | |
| 2010/0318631 A1 | 12/2010 | Shukla | |
| 2012/0066408 A1* | 3/2012 | Richardson | H04L 29/12066 |
| | | | 709/238 |
| 2013/0312081 A1 | 11/2013 | Shim et al. | |
| 2014/0187265 A1 | 7/2014 | Yinjun | |
| 2015/0256508 A1* | 9/2015 | Townsend | H04L 61/20 |
| | | | 709/245 |

OTHER PUBLICATIONS

The Extended European Search Report dated Feb. 6, 2018 for European Patent Application No. 15822312.3, 7 pages.

Jin, et al., "Proposal of an Adaptive Firewall System in Collaboration with Extended DNS", International Symposium on Applications and the Internet, IEEE, Jul. 18, 2011, pp. 222-225.

Translated the Search Report from corresponding Chinese Patent Application No. 201410342598.2, dated Jan. 31, 2018, 1 page.

European Office Action dated Nov. 16, 2018 for the European Patent Application No. 15822312.3, a counterpart foreign application of the U.S. Appl. No. 14/801,224, 4 pages.

* cited by examiner

METHOD AND SERVER OF REMOTE INFORMATION QUERY

CROSS REFERENCE TO RELATED PATENT APPLICATION

This application claims foreign priority to Chinese Patent Application No. 201410342598.2 filed on Jul. 17, 2014, entitled "Method and Server of Remote Information Query", which is hereby incorporated by reference in its entirety.

TECHNICAL FIELD

The present disclosure relates to the technological field of communications, and in particular, to methods and servers of remote information query.

BACKGROUND

With the rapid development of the Internet, the number of Internet users increases daily. Some of these Internet users may hack into Internet systems intentionally to engage in illegal activities, such as data theft. Therefore, an issue of analyzing the security of the Internet users emerges.

In existing technologies, information needed for the security analysis of a user is obtained using a remote query approach to determine whether the user is a secure user when the security of the user is analyzed. However, remote query approaches, such as RPC (Remote Procedure Call), Soap (Simple Object Access Protocol) or Rest (Representational State Transfer), etc., are based on TCP (Transmission Control Protocol)/HTTP (Hypertext Transfer Protocol). When the security analysis of a user is performed based on these protocols, a development of a corresponding software module at a client side is often needed in order to facilitate a construction of a corresponding query request. A development of a corresponding software module for a content server to which the query request is directed is also needed in order to recognize this constructed query request. In short, when performing the security analysis of the user, the existing technologies need to construct and recognize the query request, thus resulting in a complicated recognition method.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method and a server of remote information query. By adding a type identifier corresponding to a type of query request in existing query requests, a simpler and highly efficient recognition of user security may be realized.

A first aspect provides a method of remote information query, which includes receiving a query request sent from a client side; obtaining content of a type field of the query request; obtaining a type of the query request based on the content of the type field; adding a type identifier corresponding to the type and a domain name of a preset authorized Domain Name System (DNS) into the query request to obtain a target query request; sending the target query request to a local DNS to enable the local DNS to send the target query request to the preset authorized DNS according to the domain name of the preset authorized DNS in the target query request; and receiving a response message that corresponds to the type of the query request from the preset authorized DNS.

A second aspect provides a server, which includes a receiving unit, an acquisition unit, an adding unit and a sending unit. The receiving unit receives a query request from a client side and obtains content of a type field of the query request. The acquisition unit acquires a type of the query request based on the content of the type field. The adding unit adds a type identifier corresponding to the type acquired by the acquisition unit and a domain name of a preset authorized Domain Name System (DNS) into the query request to acquire a target query request. The sending unit sends the target query request acquired by the adding unit to a local DNS to enable the local DNS to send the target query request to the preset authorized DNS according to the domain name of the preset authorized DNS in the target query request, and receives a response message corresponding to the type of the query request from the preset authorized DNS.

The method and the server of remote information query provided by the present disclosure first obtain a query request sent from a client side, and add a type identifier and a domain name of a preset authorized DNS to the acquired query request for sending to the preset authorized DNS. Finally, the method and server, by the preset authorized DNS, return a response message of this query request. Therefore, the disclosed method adds a type identifier corresponding to a type of a query request into an existing query request based on a DNS protocol, thus achieving a simpler and highly efficient recognition of user security.

DETAILED DESCRIPTION

To make objectives, technical solutions, and advantages of the embodiments of the present disclosure more comprehensible, the technical solutions in the embodiments of the present disclosure are clearly and fully described herein with reference to the accompanying drawings in the embodiments of the present disclosure. Apparently, the embodiments to be described represent some and not all of the embodiments of the present disclosure. All other embodiments acquired by one of ordinary skill in the art based on the embodiments of the present disclosure without making any creative efforts shall pertain to the scope of protection of the present disclosure.

In order to facilitate understanding of the embodiments of the present disclosure, exemplary embodiments are explained and described in further detail herein in conjunction with the drawings. These embodiments, however, do not limit implementations of the present disclosure.

The method and the server of remote information query provided by the embodiments of the present disclosure are applicable to scenarios in which a security analysis is performed for an electronic commerce user, especially scenarios in which a security analysis is performed for a remote electronic commerce user. In the present disclosure, a security analysis of a remote Internet user is performed based on a DNS (Domain Name System) protocol. The DNS protocol per se is a relatively simple protocol, and thus a remote information query with a high efficiency may be achieved.

Figure 1:
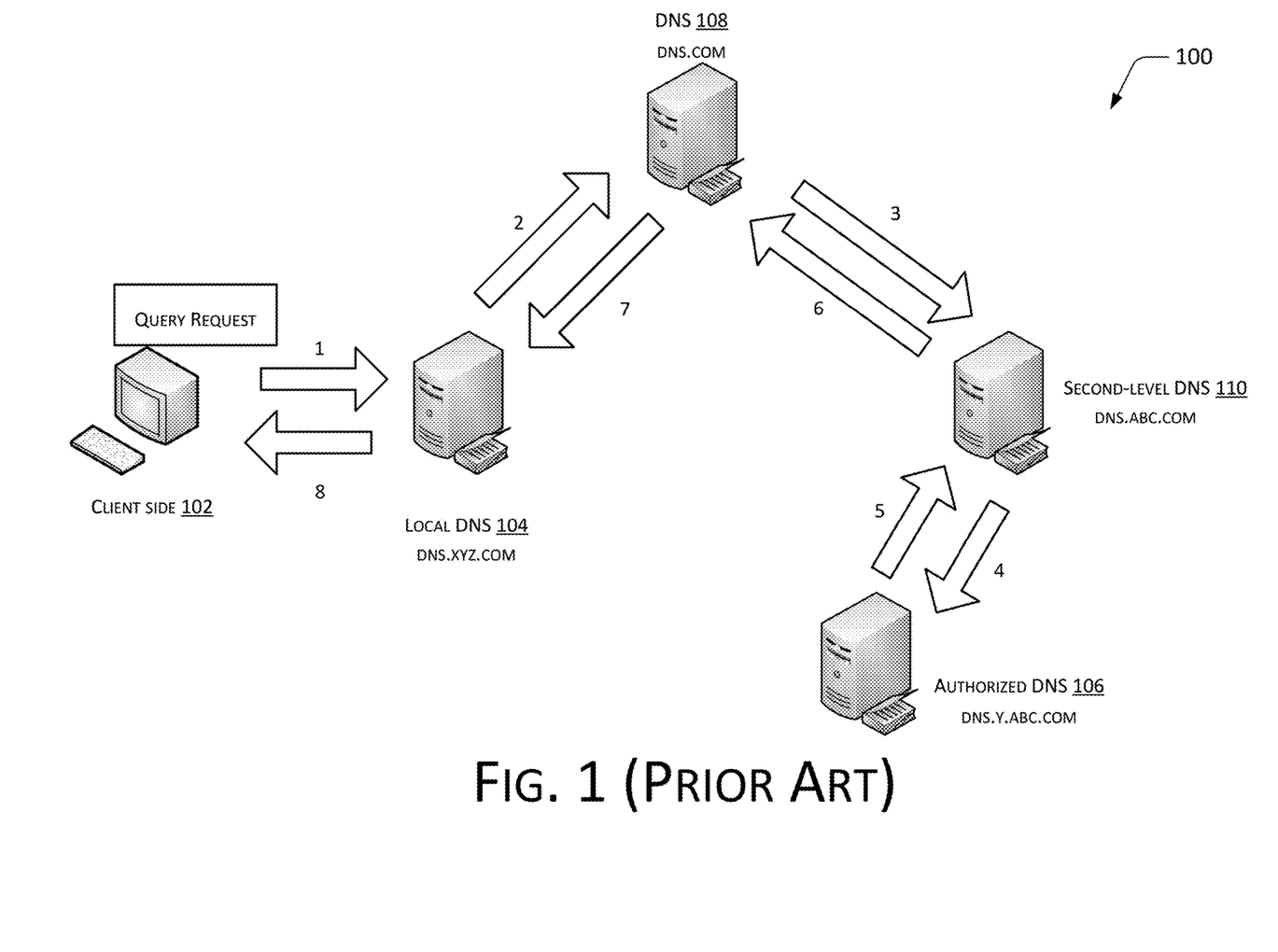
FIG. 1 is a schematic diagram of a method of remote information query by a client side in accordance with existing technologies.

FIG. 1 is a schematic diagram of a method 100 of remote information query by a client side in the existing technologies, which includes a client side 102, a local DNS 104, an authorized DNS 106, a DNS 108 and a second-level DNS 110. In FIG. 1, the client side 102 first sends a query request to the local DNS 104. The query request includes a URL (Uniform Resource Locator) address, for example, "www.alipay.com". If the IP (Internet Protocol) address corresponding to this URL address is 110.75.142.111 and the client side 102 does not send this query request for the first time, the local DNS 104 directly returns "110.75.142.111" and "www.alipay.com" to the client side 102. "110.75.142.111" represents an IP address corresponding to the URL address sent by the client side 102 and "www.alipay.com" represents an alias name of the URL address sent by the client side 102. Since this URL address does not have an alias name in this example, an alias name that is returned is the same as the URL address.

It should be noted that the IP address is the one that is locally cached after the local DNS 104 acquires the IP address from the authorized DNS 106 in response to the client side 102 sending the query request to the local DNS 104 for the first time. This IP address is deleted from the local DNS 104 after a TTL (Time-To-Live) ends.

As can be seen from the above example, the local DNS 102 and the authorized DNS 106 in the existing technologies merely resolve the URL address sent by the client side 102, and return the IP address corresponding thereto, and do not support queries for other information. For instance, when analyzing a security issue associated with a user, information such as a location in which the user is located and whether the user has already been included in a blacklist is needed to be queried.

Figure 2:
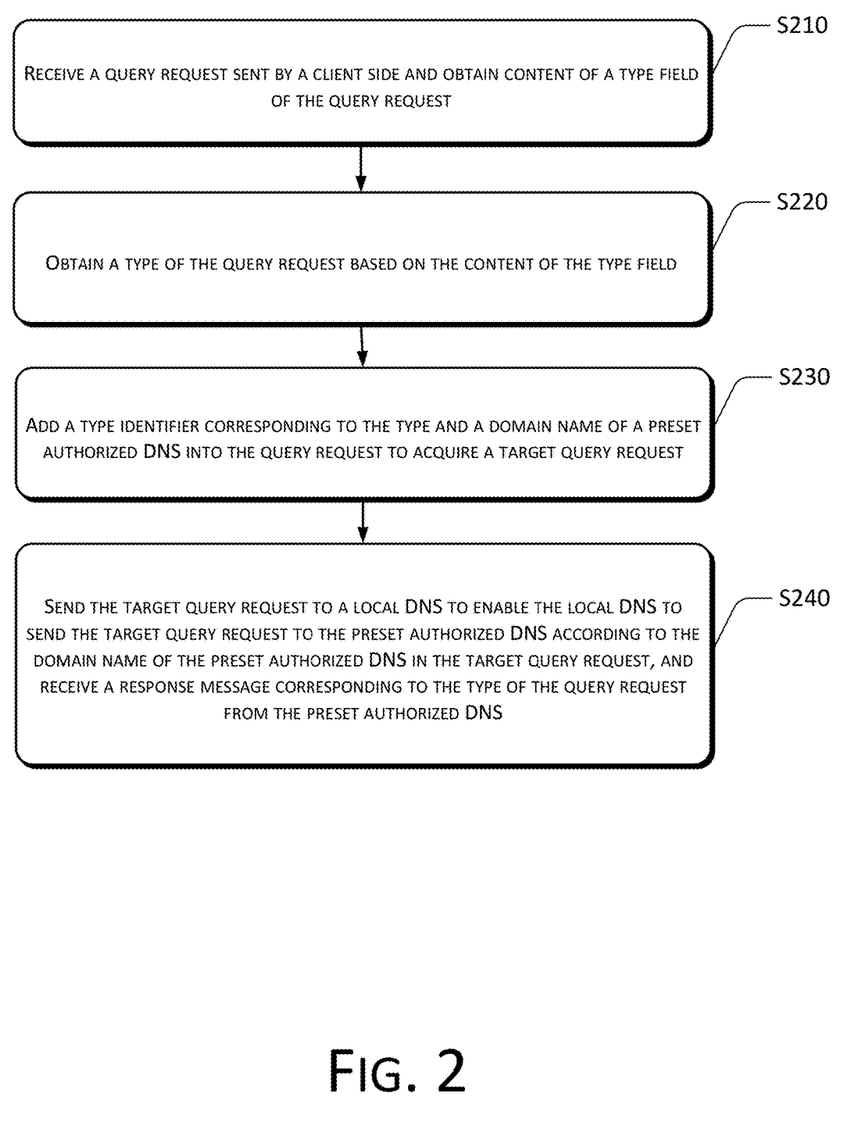
FIG. 2 is a flowchart of a method of remote information query in accordance with a first embodiment of the present disclosure.

FIG. 2 is a flowchart of a method of remote information query according to a first embodiment of the present disclosure. As shown in FIG. 2, the method includes:

S210 receives a query request sent by a client side and obtains content of a type field of the query request.

A content server receives a query request, for example, receives a request for querying a location of an IP address "192.168.22.1". The content server is located between a client side and a local DNS, and is used for modifying the query request sent by the client side (such as adding a type identifier corresponding to a type of the query request) and sending the modified query request to the local DNS. The query request includes content of a type field of the query request. In an embodiment, the content of the type field of the query request may include a query for a location to which an IP address belongs or a query about whether the IP address is included in a blacklist. In this example, the content of the type field of the query request is a query for the location to which the IP address belongs.

It should be noted that the content of the type field of the query request may further include a query for data information which is not changed frequently, for example, a query for the air quality, etc., of ZZ District of YY City in XX Province.

S220 obtains a type of the query request based on the content of the type field.

It should be noted that a particular number of types of query requests may be defined in advance. For example, one thousand types of query requests, which are represented as $q_1, q_2, \ldots, q_{1000}$ respectively, may be defined in advance. When contents of type fields of query requests are different, types corresponding to these query requests are different. For example, when the content of the type field of the query request is a query for a location to which an IP address belongs, a type of the query request may be $q_1$, and when the content of the type field of the query request is a query as to whether the IP address is included in a blacklist, the type of the query request may be $q_2$. Similarly, when the content of the type field of the query request is a query for other data information which is not frequently changed, the type of the query request may be $q_i$, wherein $3 \leq i \leq 1000$. For example, when the content of the type field of the query request is the air quality of ZZ District of YY City in XX Province, the type of the query request may be $q_3$.

S230 adds a type identifier corresponding to the type and a domain name of a preset authorized DNS into the query request to acquire a target query request.

It is noted herein that the domain name of the preset authorized DNS is applied in advance. Optionally, the domain name may be a second-level domain name, for example, "alipay.com". The preset authorized DNS is used for resolving a query request including the domain name, i.e., resolving all query requests for "*.alipay.com". The preset authorized DNS may be formed by a module that is newly added in the authorized DNS for resolving query requests including the above-mentioned domain name as shown in FIG. 1. Thus, the preset authorized DNS in the present disclosure has the advantages of simple design and low development cost.

When the query request includes an IP address of the client side, method block S230 may further include: arranging all segments of the IP address in a reverse order, and adding a type identifier corresponding to the type and the domain name of the preset authorized DNS thereto sequentially to acquire a target query request.

For example, if the IP address included in the query request is "192.168.22.1", "1.22.168.192" is obtained after arranging all segments of the IP address are arranged in a reverse order. If the type of the query request obtained at S220 is $q_1$ and the domain name of the preset authorized DNS is "alipay.com", a target request that is obtained is "1.22.168.192.$q_1$.alipay.com" after $q_1$ and the domain name of the preset authorized DNS are sequentially added to "1.22.168.192". It can be understood that the obtained target request is "1.22.168.192.$q_2$.alipay.com" if the type of the query request obtained at S220 is $q_2$ after $q_2$ and the domain name of the preset authorized DNS are sequentially added to "1.22.168.192".

It should be noted that, when the query request does not include an IP address of the client side and includes other address information such as a URL address, the address information also needs to be arranged in a reverse order. Moreover, the type identifier corresponding to the type and the domain name of the preset authorized DNS are sequentially added thereto to generate a target query request. For example, if a query request received by the content server corresponds to a query for the air quality of Shangcheng District of Hangzhou City in Zhejiang Province, a target query request that is generated is "shangcheng.hz.zj.q₃.alipay.com", where $q_3$ is the type (a query for the air quality) of the query request, zj represents Zhejiang Province, hz represents Hangzhou City and shangcheng represents Shengcheng District.

S240 sends the target query request to a local DNS to enable the local DNS to send the target query request to the preset authorized DNS according to the domain name of the preset authorized DNS in the target query request, and receives a response message corresponding to the type of the query request returned from the preset authorized DNS.

Upon obtaining the target query request, the content server sends the target query request to a local DNS. In response to receiving the target query request, the local DNS searches for the preset authorized DNS through a recursion/iteration mode based on "alipay.com" in the target query request. Alternatively, address information of the preset authorized DNS may be directly recorded in the local DNS. In response to receiving the query request including the domain name of the preset authorized DNS, the local DNS sends the query request directly to the preset authorized DNS.

It should be noted that a recursion/iteration mode of searching for a preset authorized DNS belongs to existing technologies, which is not redundantly described herein.

It is noted herein that, when the content of the type field of the query request at S210 is a query for a location to which the IP address belongs, the response message includes information which identifies the location of the IP address. When the content of the type field of the query request at S210 is a query about whether the IP address is included in a blacklist, the response message includes information which identifies whether the IP address is included in a blacklist. Similarly, when the content of the type field of the query request at S210 is a query for other data information which is not frequently changed, the response message includes identification information corresponding to the other data information which is not frequently changed.

In the above example, when the type of the query request is $q_1$, the information which identifies the location to which the IP address belongs may be a code associated with an area. Optionally, the response message may further include other information such as service provider(s), etc. When the response message includes other information, the response message may be represented in segments, e.g., "10.0.0.25", where the last segment is designated as information that identifies the location to which the IP address belongs.

For another example, when the type of the query request is $q_2$, the information which identifies whether the IP address is included in a blacklist may be a one-digit number. Optionally, the response message may further include other information, such as a number of times of login and a number of times of committed crimes. When the response message includes other information, the response message may be represented in segments e.g., "127.0.0.1", where the last segment is designated as information identifying that the IP address is included in a blacklist. When the IP address is included in a blacklist, the last segment may be 1. When the IP address is not included in a blacklist, the last segment may be 0.

After the local DNS receives the response message returned by the preset authorized DNS, a correspondence relationship between the IP address and the information which identifies the location to which the IP address belongs is cached in the local DNS. Alternatively, a correspondence relationship between the IP address and the information which identifies whether the IP address is included in a blacklist is cached in the local DNS.

For instance, in the above example, when the IP address included in the query request is "192.168.22.1" and the returned response message is "10.0.0.25", a correspondence relationship between the IP address and the returned response message is cached. Before the end of TTL, the local DNS directly returns the response message "10.0.0.25" to the client side when the local DNS receives the above-mentioned query request again and the type of the query request is $q_1$.

In the present disclosure, it should be noted that the client side needs to negotiate with the local DNS and the preset authorized DNS in advance regarding information represented by each segment in a response message. For example, the client side may negotiate with the local DNS and the preset authorized DNS in advance to use the last segment in a response message to represent information that identifies a location to which an IP address belongs. Thereafter, if desiring to obtain the location of the IP address, the client side may directly resolve information of the last segment in response to receiving a response message returned by the local DNS. In an embodiment, the client side may record content represented by received identification information in a tabular format. An example of tabular content recorded by the client side is given as follows:

| | |
|---|---|
| 24 | Beijing |
| 25 | Hubei |

In the above example, when the response message received by the client side is "10.0.0.25", for example, the information of the last segment "25" is directly resolved, i.e., a location to which an IP address "192.168.22.1" belongs is found to be "Hubei" by querying the above table.

As described in the foregoing embodiments, after the location to which the IP address belongs in the query request is acquired, a security analysis module or software may perform an analysis of the security of the Internet user(s) who use(s) this IP address. For example, if the acquired location to which the IP address "192.168.22.1" belongs at the beginning is "Hubei" and the location to which this IP address belongs is "Beijing" after half an hour, this IP address is listed as an unsafe IP address because the location has changed quickly within half an hour.

The method of remote information query provided by the present disclosure first obtains a query request sent by a client side, adds a type identifier and a domain name of a preset authorized DNS to the obtained query request, which is sent to the preset authorized DNS thereafter. Finally, the preset authorized DNS returns a response message for the query request. Therefore, the disclosed method can implement a highly efficient remote information query under an existing software configuration environment of the client side.

Figure 3:
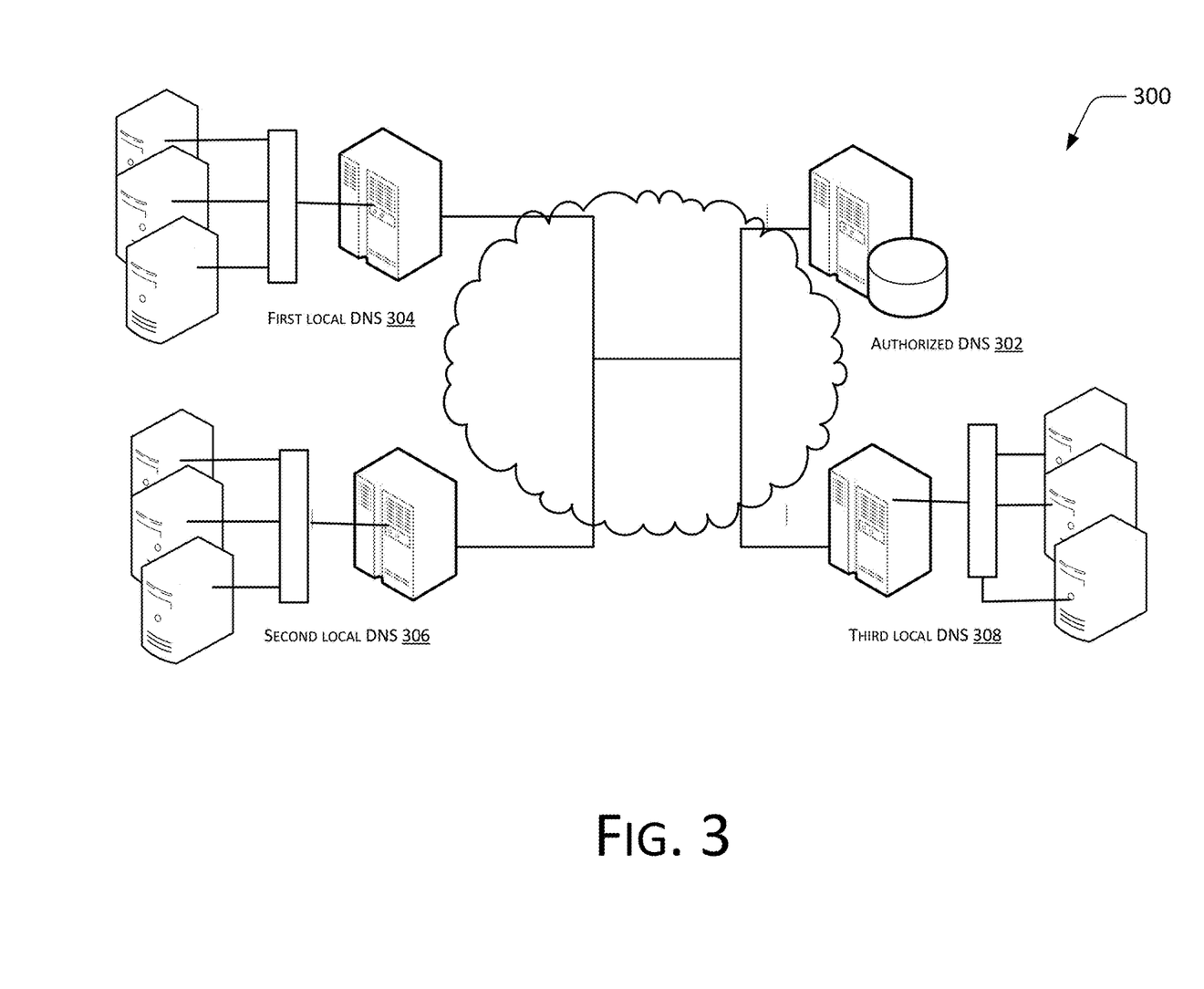
FIG. 3 is a distributed management system in accordance with the present disclosure.

It should be noted that the disclosed method is applicable not only to the security analysis of Internet users, but also to a distributed management system. FIG. 3 shows a distributed management system 300 provided by the present disclosure. An authorized DNS 302 may be an authorized DNS provided in the first embodiment. A first local DNS 304 may be responsible for querying respective locations to which IP addresses belong. A second local DNS 306 may be responsible for querying a blacklist and a whitelist of IP addresses. A third local DNS 308 may be responsible for querying system resources. In response to receiving a target query request sent by a client side, the authorized DNS 302 in FIG. 3 obtains a type of the target query request by analyzing the target query request. For example, when content of a type field of the query request is a query for a location to which an IP address belongs, the query request is sent to the first local DNS 304. Thus, the workload of the authorized DNS 302 may be shared, and a problem of resource consumption due to database synchronization in existing technologies may be avoided.

Figure 4:
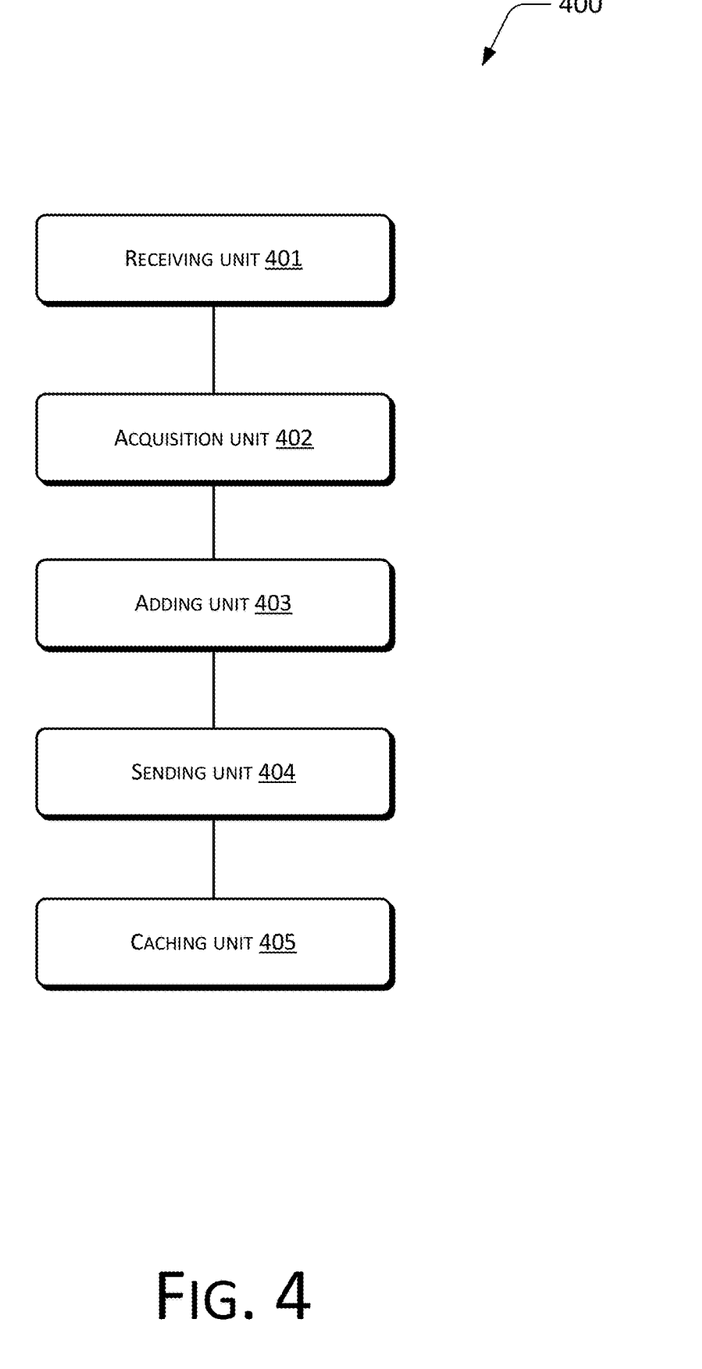
FIG. 4 is a schematic diagram of a server in accordance with a second embodiment of the present disclosure.

Corresponding to the aforementioned method of remote information query, the embodiments of the present disclosure further provide a server 400. The server 400 may be the content server given in the first embodiment. As shown in FIG. 4, the server 400 includes: a receiving unit 401, an acquisition unit 402, an adding unit 403 and a sending unit 404.

The receiving unit 401 is used for receiving a query request sent by a client side and obtaining content of a type field of the query request.

The acquisition unit 402 is used for obtaining a type of the query request based on the content of the type field.

The adding unit 403 is used for adding a type identifier corresponding to the type obtained by the acquisition unit 402 and a domain name of a preset authorized DNS (Domain Name System) into the query request to obtain a target query request.

The sending unit 404 is used for sending the target query request obtained by the adding unit 403 to a local DNS to enable the local DNS to send the target query request to the preset authorized DNS according to the domain name of the preset authorized DNS in the target query request, and receiving a response message corresponding to the type of the query request from the preset authorized DNS.

Optionally, the query request may include an IP (Internet Protocol) address of the client side.

In an embodiment, the adding unit 403 is further used for arranging all segments of the IP address in a reverse order and adding the type identifier corresponding to the type and the domain name of the preset authorized DNS thereto sequentially to obtain the target query request.

Optionally, the content of the type field of the query requests may include a query for a location to which the IP address belongs or a query as to whether the IP address is included in a blacklist.

Optionally, the response message includes information which identifies the location to which the IP address belongs or information which identifies whether the IP address is included in the blacklist.

Optionally, the server 400 may further include: a caching unit 405 which is used for caching a correspondence relationship between the IP address and the information which identifies the location to which the IP address belongs in the local DNS or caching a correspondence relationship between the IP address and the information which identifies whether the IP address is included in the blacklist in the local DNS.

Optionally, the client side negotiates with the local DNS and the preset authorized DNS in advance on respective information represented by each segment in the response message.

The method provided by the first embodiment of the present disclosure is embedded in the server 400 provided by the second embodiment of the present disclosure. Therefore, the details of a process of operations of the disclosed server are not repeatedly described herein.

The disclosed server first obtains a query request sent by a client side, adds a type identifier and a domain name of a preset authorized DNS to the obtained query request, which is sent to the preset authorized DNS thereafter. Finally, the preset authorized DNS returns a response message for the query request. Therefore, the disclosed method can implement a highly efficient remote information query under an existing software configuration environment of the client side.

One skilled in the art should further understand that objects and method blocks of algorithms of each example described in the disclosed embodiments of the present disclosure may be implemented in the form of electronic hardware, computer software, or a combination thereof. In order to clearly describe the exchangeability of hardware and software, the above description has generally described the composition and method blocks of each embodiment in terms of functionalities. Whether these functionalities are performed by hardware or software depends on specific applications and design constraint conditions of the technical solutions. One skilled in the art may use different methods to implement the described functions for each particular application. However, such implementation should not be considered to be outside the scope of the present disclosure.

The method blocks of the method or the algorithm described in the embodiments disclosed herein may be implemented by hardware, software module(s) executed by processor(s), or a combination thereof. The software module(s) may be deployed in a Random Access Memory (RAM), an internal memory, a Read Only Memory (ROM), an Electrically Programmable ROM, an Electrically Erasable Programmable ROM, a register, a hard disk, a removable disk, a CD-ROM, or any other storage media well-known in the art.

Figure 5:
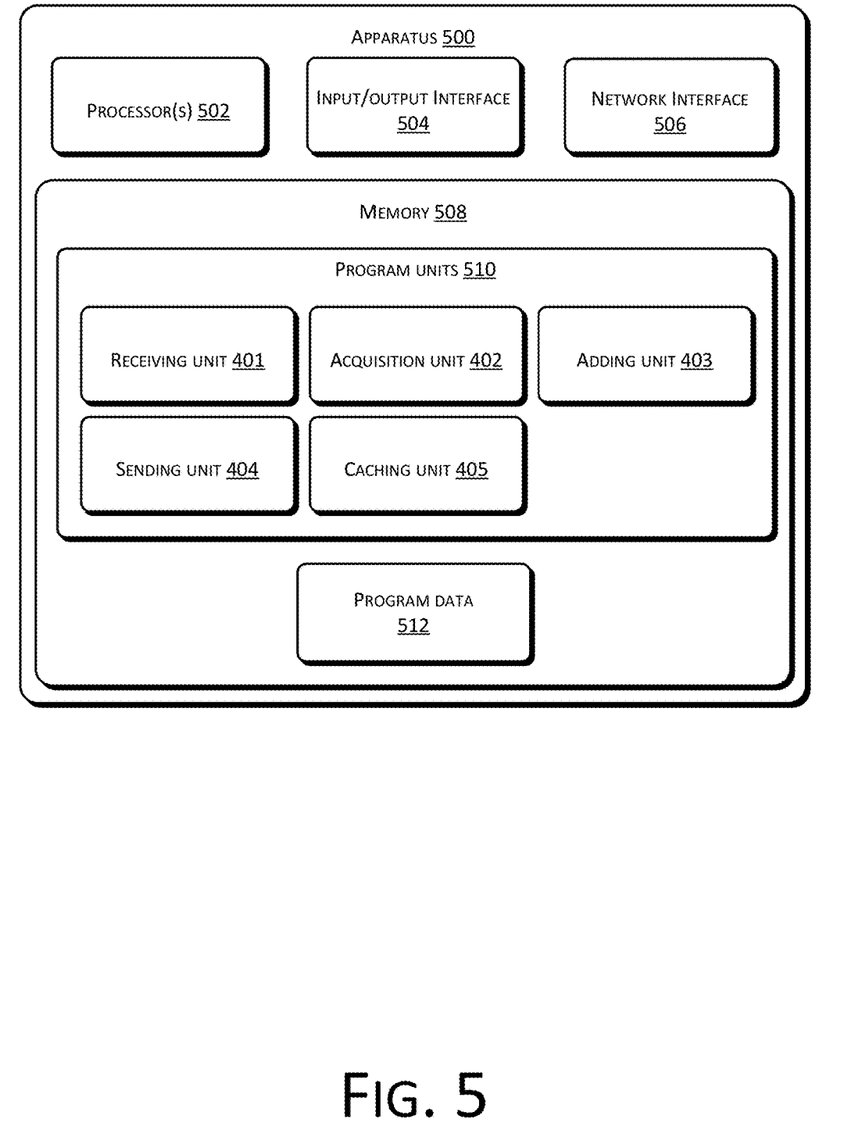
FIG. 5 is a structural diagram of the example server as described in FIG. 4 in further detail.

For example, FIG. 5 shows an example server or apparatus 500, as described in FIG. 4, in more detail. In an embodiment, the apparatus 500 may include one or more processors (CPUs) 502, an input/output interface 504, a network interface 506 and memory 508.

The memory 508 may include a form of computer readable media such as volatile memory, Random Access Memory (RAM), and/or non-volatile memory, e.g., Read-Only Memory (ROM) or flash RAM, etc. The memory 508 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 508 may include program units 510 and program data 512. The program units 510 may include one or more modules as described in the foregoing embodiments. For example, the program units 510 may include one or more of a receiving unit 401, an acquisition unit 402, an adding unit 403, a sending unit 404 and a caching unit 405. Details of these units have been described in the foregoing embodiments, and are therefore not repeatedly described herein.

The foregoing exemplary implementations describe the objectives, solutions, and benefits of the present disclosure in further detail. It should be understood that the above description merely represents exemplary implementations of the present disclosure and is not intended to limit the scope of protection of the present disclosure. Any modifications, equivalent replacements, improvements, etc., made without departing from the spirit and principles of the present disclosure shall be included in the scope of protection of the present disclosure.

The invention claimed is:

1. A method implemented by one or more computing devices, the method comprising:
   receiving, by a content server, a query request sent by a client side and obtaining content of a type field of the query request;
   obtaining, by the content server, a type of the query request based at least in part on the content of the type field;
   adding, by the content server, a type identifier corresponding to the type and a domain name of a preset authorized Domain Name System (DNS) into the query request to obtain a target query request; and
   sending, by the content server, the target query request to the local DNS to enable the local DNS to send the target query request to the preset authorized DNS according to the domain name of the preset authorized DNS in the target query request and receiving, by the content server, a response message corresponding to the type of the query request from the preset authorized DNS;
   wherein the content server is located between a client side and a distributed management system, the distributed management system including the preset authorized DNS and one or more local DNS, and wherein each local DNS is responsible for a different type of querying information based on a type of the target query request; and
   the client side negotiates with the local DNS and the preset authorized DNS in advance regarding respective information represented by each segment in the response message.

2. The method of claim 1, wherein the query request comprises an Internet Protocol (IP) address of the client side.

3. The method of claim 2, wherein adding the type identifier corresponding to the type and the domain name of the preset authorized DNS into the query request to obtain the target query request comprises:
   arranging a plurality of segments of the IP address in a reverse order; and
   sequentially adding the type identifier corresponding to the type and the domain name of the preset authorized DNS to the plurality of segments of the IP address that are in the reverse order to obtain the target query request.

4. The method of claim 2, wherein the content of the type field of the query request comprises one or more of a query for a location to which the IP address belongs and a query for whether the IP address is included in a blacklist.

5. The method of claim 4, wherein the response message comprises one or more of information which identifies the location to which the IP address belongs and information which identifies whether the IP address is included in the blacklist.

6. The method of claim 5, further comprising one or more of:
   storing a correspondence relationship between the IP address and the information which identifies the location to which the IP address belongs in the local DNS; and
   storing a correspondence relationship between the IP address and the information which identifies whether the IP address is included in the blacklist in the local DNS.

7. A content server comprising:
   one or more processors;
   memory;
   a receiving unit stored in the memory and when executed by the one or more processors receives a query request sent by a client side and to obtain content of a type field of the query request;
   an acquisition unit stored in the memory and when executed by the one or more processors obtains a type of the query request based on the content of the type field;
   an adding unit stored in the memory and when executed by the one or more processors adds a type identifier corresponding to the type obtained by the acquisition unit and a domain name of a preset authorized DNS (Domain Name System) into the query request to obtain a target query request; and
   a sending unit stored in the memory and when executed by the one or more processors sends the target query request obtained by the adding unit to a local DNS to enable the local DNS to send the target query request to the preset authorized DNS according to the domain name of the preset authorized DNS in the target query request and to receive a response message corresponding to the type of the query request from the preset authorized DNS;
   wherein the content server is located between a client side and a distributed management system, the distributed management system including the preset authorized DNS and one or more local DNS, and wherein each local DNS is responsible for a different type of querying information based on a type of the target query request; and
   the client side negotiates with the local DNS and the preset authorized DNS in advance regarding respective information represented by each segment in the response message.

8. The server of claim 7, wherein the query request includes an IP (Internet Protocol) address of the client side.

9. The server of claim 8, wherein the adding unit is further configured to arrange a plurality of segments of the IP address in a reverse order and to sequentially add the type identifier corresponding to the type and the domain name of the preset authorized DNS to the plurality of segments of the IP address that are in the reverse order to obtain the target query request.

10. The server of claim 8, wherein the content of the type field of the query request comprises one or more of: a query for a location to which the IP address belongs and a query for whether the IP address is included in a blacklist.

11. The server of claim 10, wherein the response message comprises one or more of information which identifies the location to which the IP address belongs and information which identifies whether the IP address is included in the blacklist.

12. The server of claim 11, further comprising a caching unit stored in the memory and executable by the one or more processors to cache one or more of a correspondence relationship between the IP address and the information which identifies the location to which the IP address belongs in the local DNS, and a correspondence relationship between the IP address and the information which identifies whether the IP address is in included the blacklist in the local DNS.

13. One or more computer-readable media storing executable instructions that, when executed by one or more processors, cause the one or more processors to perform acts comprising:
   receiving, by a content server, a query request sent by a client side and obtaining content of a type field of the query request;
   obtaining, by the content server, a type of the query request based at least in part on the content of the type field;
   adding, by the content server, a type identifier corresponding to the type and a domain name of a preset authorized Domain Name System (DNS) into the query request to obtain a target query request; and
   sending, by the content server, the target query request to the local DNS to enable the local DNS to send the target query request to the preset authorized DNS according to the domain name of the preset authorized DNS in the target query request and receiving, by the content server, a response message corresponding to the type of the query request from the preset authorized DNS;
   wherein the content server is located between a client side and a distributed management system, the distributed management system including the preset authorized DNS and one or more local DNS, and wherein each local DNS is responsible for a different type of querying information based on a type of the target query request; and
   the client side negotiates with the local DNS and the preset authorized DNS in advance regarding respective information represented by each segment in the response message.

14. The one or more computer-readable media of claim 13, wherein the query request includes an Internet Protocol (IP) address of the client side.

15. The one or more computer-readable media of claim 14, wherein adding the type identifier corresponding to the type and the domain name of the preset authorized DNS into the query request to obtain the target query request comprises:
   arranging a plurality of segments of the IP address in a reverse order; and
   sequentially adding the type identifier corresponding to the type and the domain name of the preset authorized DNS to the plurality of segments of the IP address that are in the reverse order to obtain the target query request.

16. The one or more computer-readable media of claim 14, wherein the content of the type field of the query request comprises one or more of a query for a location to which the IP address belongs and a query for whether the IP address is included in a blacklist.

17. The one or more computer-readable media of claim 15, wherein the response message comprises one or more of information which identifies the location to which the IP address belongs and information which identifies whether the IP address is included in the blacklist.

18. The one or more computer-readable media of claim 16, the acts further comprising one or more of:
   storing a correspondence relationship between the IP address and the information which identifies the location to which the IP address belongs in the local DNS; and
   storing a correspondence relationship between the IP address and the information which identifies whether the IP address is included in the blacklist in the local DNS.

* * * * *